United States Patent [19]

Winsel

[11] Patent Number: 4,504,561
[45] Date of Patent: Mar. 12, 1985

[54] LITHIUM PEROXIDE PRIMARY ELEMENT

[75] Inventor: August Winsel, Kelkheim, Fed. Rep. of Germany

[73] Assignee: Varta Batterie Aktiengesellschaft, Hanover, Fed. Rep. of Germany

[21] Appl. No.: 169,953

[22] Filed: Jul. 18, 1980

[30] Foreign Application Priority Data

Jul. 25, 1979 [DE] Fed. Rep. of Germany ....... 2930056

[51] Int. Cl.³ ............................................. H01M 6/22
[52] U.S. Cl. ....................................... 429/101; 429/27
[58] Field of Search ........................ 429/12, 13, 27, 29, 429/101, 105, 218, 122, 118

[56] References Cited

U.S. PATENT DOCUMENTS 3,791,871  2/1974  Rowley ............................. 429/118
3,825,445  7/1974  MacCarthy ......................... 429/29

OTHER PUBLICATIONS

Kemp et al., Design of Performance Features of A 0.45 kW, 4kWh Lithium Water Marine Battery, 11th Intersociety Energy Conversion Eng. Conference, State Line Nev. USA (Sep. 12-17, 1976, pp. 769078-769078.

Primary Examiner—Donald L. Walton
Attorney, Agent, or Firm—Weiser & Stapler

[57] ABSTRACT

In a galvanic primary element of the system $Li/H_2O_2$, the aqueous cathode depolarizer $H_2O_2$ is fixated as a polyurethane gel. It can thereby be controlled and caused to react with the anode metal in accordance with the current drain requirements. This is accomplished using a ram to press the gel toward a conductor which covers the lithium anode, which may take the form of a metal grid and/or a gas diffusion electrode. The oxygen which forms in the working layer through catalytic decomposition of hydrogen peroxide creates a gas bubble when the current is interrupted or the ram is stopped, thereby interrupting the further supply of hydrogen peroxide to the catalyst.

5 Claims, 1 Drawing Figure

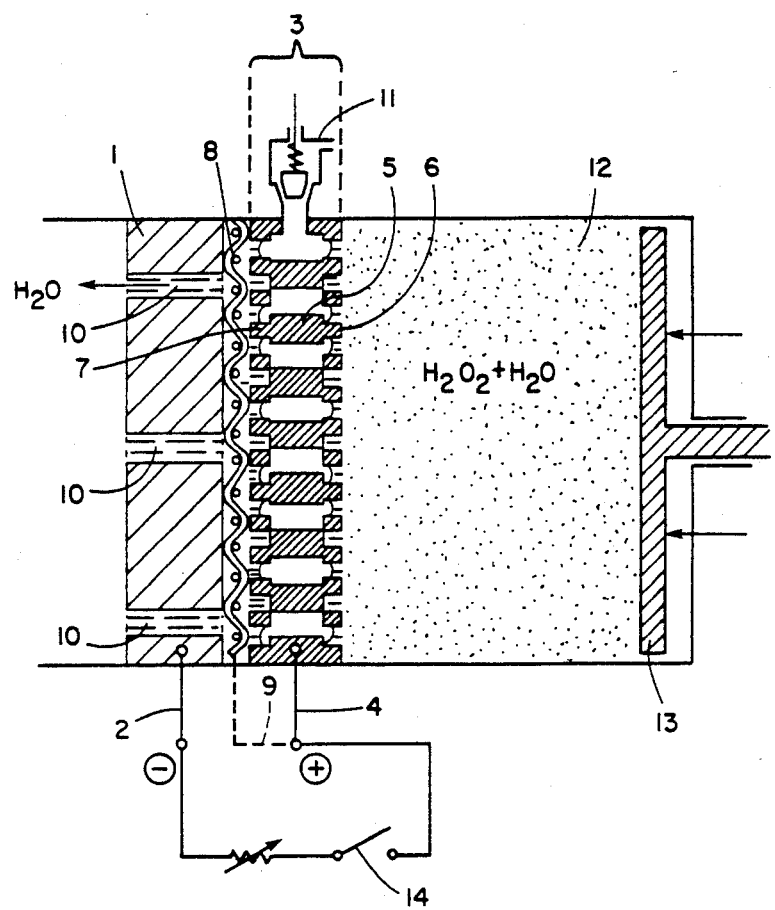

LITHIUM PEROXIDE PRIMARY ELEMENT

The invention relates to a galvanic primary element having a negative light metal electrode and having hydrogen peroxide as the cathode depolarizer.

The high energy content of light metal electrodes which results from their strongly electropositive properties, and particularly those of alkaline metals, was originally susceptible of being used only in water-free electrochemical systems in which, under appropriate conditions, a gaseous oxidizing means was dissolved as cathode depolarizer in an organic solvent, for example, in the $Li/SO_2$ system.

In the meantime, primary elements have also become known which, as for example, the $Li/H_2O_2$ cell, contain a highly reactive alkali metal as the negative electrode and an aqueous medium in contact with same as the positive electrode material. In a manner similar to some fuel cells, in which liquid or dissolved reactants such as hydrazene, sodium boronate, alcohols or hydrogen peroxide are continuously supplied to the catalytically active electrodes, in the above-mentioned primary elements, the positive electrode is also continuously supplied with the liquid depolarizer.

In the simplest case, the depolarizer can be water. In that case, the system $Li/H_2O$ yields an open circuit cell voltage $E=2.2$ V and a theoretical energy density of 8,423 wh/kg Li.

By using hydrogen peroxide in place of water, the open circuit cell voltage and the theoretical energy density can be almost doubled. Thus, for the $Li/H_2O_2$ system, one obtains a voltage $E=3.98$ V and an energy density of 15,391 wh/kg Li.

Primary cells of this type are made of a plate-like lithium electrode which is mechanically contacted by an iron screen and to which the $H_2O_2$ solution is continuously supplied through the iron screen. The iron screen is plated with catalyst metals such as silver or palladium, and, in conjunction with the $H_2O_2$, constitutes the positive electrode.

In known cell structures, the iron screen is resupplied to the lithium electrode to the extent that the latter is consumed by the electrochemical reaction in accordance with $$Li + \tfrac{1}{2}H_2O_2 \rightarrow LiOH \qquad (1)$$

or undergoes corrosion in accordance with the formula $$Li + H_2O \rightarrow LiOH + \tfrac{1}{2}H_2. \qquad (2)$$

The LiOH which is formed is a water soluble electrolyte which is constantly renewed as a film between the two electrodes.

Furthermore, oxygen forms in the cell by decomposition of the hydrogen peroxide in accordance with the formula $$H_2O_2 \rightarrow H_2O + \tfrac{1}{2}O_2. \qquad (3)$$

In this mode of operation, the $H_2O_2$ supply to the cell is maintained as such. However, due to the parasitic processes described in equations (2) and (3) above, $H_2$ and $O_2$ evolve increasingly as less and less of the available $H_2O_2$ is immediately consumed by the current producing process.

Accordingly, it is a primary object of the invention to provide a galvanic primary element with a negative light metal electrode and hydrogen peroxide as the cathode depolarizer in which it is possible to supply the reactants to the reaction chamber in a controlled fashion which matches the current drain requirements.

This and other objects which will appear are accomplished by fixating the hydrogen peroxide appropriately and preferably in a polyurethane gel.

More particularly, it has been found that polyurethane which is produced in accordance with the di-isocyanate-polyaddition process of Farbenfabriken Bayer (see German Patent DE-PS No. 728,981) from di-isocyanate and polyhydroxy polyethers in accordance with the general formula $$HO(R_1O)_nH + OCN-R_2-NCO + HO(R_1O)_n-$$
$$H + OCN-R_2-NCO + \ldots$$
$$\rightarrow -O(R_1O)_n-OCNH-R_2-NHCO-O(R_1O)-$$
$$_n-OCNH-R_2-NHCO-$$

not only with water but also with hydrogen peroxide form a gel which contains large quantities of liquid.

Particularly suitable as dialcohols for the production of gel-forming polyurethane are polyhydroxy polyethers, $HO(R_1O)_nH$, the molecular weight of which lies between 2,000 and 6,000 and which was produced by polymerization of ethylene oxide, propylene oxide, or butylene oxide or mixtures of these oxides, $(R_1O)$, the polymerization degree n ranging from 30 to 150. For example, the monomer which constitutes the base of the polyhydroxy-polyether may be butane diol (1,4) or butylene oxide. Such a polyether is transformed, for example, with 1,6-Hexane-di-isocyanate into a polyurethane in accordance with the above stated formula. For the di-isocyanate components, there is generally involved a low-molecular unitary substance. The carbon residue $R_2$ may be of aliphatic or of aromatic type.

The polyurethane which is capable of forming a gel with $H_2O_2$ in accordance with the invention should have a high molecular weight (MG > 6000) but on the other hand, exhibit few branching points. In contrast, for example, to gelatin, which is a so-called secondary valence gel, the polyurethane gel according to the invention is chemically characterized as branched via its primary valences, not liquifiable and therefore a primary valence gel.

The polyurethane gel has the appearance of lard, has a stable structure and feels moist. It readily exchanges liquid, as well as other substances with its environment, but on the other hand also holds the fixated water or hydrogen peroxide like a sponge. Therefore, the polyurethane gel constitutes a reservoir in which the aqueous $H_2O_2$ solution is present as a solid, and from which it can be liberated by compression. This provides the fundamental possibility of utilizing surface pressure between the gel and an electrical conductor, which covers the surface of the light metal electrode, to supply the electrode itself with a controlled dosage supply of depolarizer material.

A gel which is also suitable for the fixation of $H_2O_2$ can be obtained from acrylic acid of methacrylic acid by polymerizing these under simultaneous introduction of branching substances. As branching components, there may be used materials which are highly soluble in water, which have two active unsaturated centers for storage and which can readily be polymerized thereby between the acrylic acid chains. Such branching components, are, for example, methylene biacrylicamide, methacrylic acid allyl ester, ethylene glycol dimethacrylate.

The polymerization is best accomplished at elevated temperature utilizing ammonium persulfate as the activator.

As negative electrode materials for the primary element embodiment of the invention, all the light metals from the group Li, Mg, Ca, Al, and Zn are suitable, but preferably lithium and also alloys of these metals.

To supply the depolarizer to the light metal electrode, a device, for example, a ram is provided in the primary element by means of which it is possible to press the gel out of the cathode space of the cell, which it initially completely fills, and toward the conductor.

The electrical conductor may consist of a catalytically active, coarsely meshed metal grid of nickel or iron. Preferably, however, there is used in its place or in addition, a three-layer gas diffusion electrode which is known, in itself, from German Patent DE-PS No. 1,241,812. This consists of a middle, catalytically active working layer having large pore diameters and cover layers attached to both sides thereof and having small pore diameters.

For further details, reference is made to the description which follows in the light of the accompanying drawing wherein:

The single FIGURE is a diagrammatic illustration of a primary element embodying the invention, embodied with a gas diffusion electrode.

Its essence consists of the light metal electrode 1 provided with the negative connector 2. Positioned ahead of this is the electrical conductor for the cathode depolarizer which consists, in the present embodiment of the element according to the invention, of the gas diffusion electrode 3 and the metal grid 8. The gas diffusion electrode is composed of the catalytically active working layer 5 and the inactive cover layers 6, 7.

The cathode space 12 is filled with the solid polyurethane gel containing $H_2O_2$. The opposite wall of the cathode space 12 is defined by ram 13.

The operation of the element embodying the invention is as follows.

Through movement of ram 13 in the direction of light metal electrode 1, the $H_2O_2$ solution is pressed out of the gel and immediately drawn or sucked in by the fine-pored cover layer 6 of gas diffusion electrode 3. The solution is thus transported into $H_2O$ the working layer 5, where the $H_2O_2$ decomposes at the catalyst into water and $O_2$. In so doing, an oxygen pressure is built up in the working layer 5 which, however, is not sufficient to overcome the capillary pressure within the narrow-pore cover layers 6, 7 and to displace the liquid therefrom. There remains in existence within the working layer 5, a gas bubble or "pillow" which, in the rest condition of the cell, and when the ram is stopped, acts as a reaction inhibitor because it prevents additional reactant solution from reaching the catalyst. A valve 11 releases the gas, if necessary, if high excess pressure develops.

Only the water, which is formed by decomposition, is taken up by the capillary active cover layer 7 and further transported to the light metal electrode 1. There it forms on the metal surface a temporary protective hydroxide skin.

If the cell is now short-circuited at terminals 2 and 4 by means of a switch 14, then a rapid reduction in size of the gas bubble takes place due to the electrochemical reaction of the oxygen with the light metal 1. Renewed ram pressure upon the gel must be exerted, in order to free up fresh reactant solution and supply it to the gas diffusion electrode 3. The movement of the ram can thus follow, in exact proportion, the current drain requirements.

The water which is formed by this $H_2O_2$ decomposition flows out through the capillaries of the cover layer 7 and is ultimately completely removed from the reaction space by the channel structures 10 in the light metal electrode 1.

If only the metal grid 8 with its connector 9 is available as the electrical take-off conductor, this does not alter the fundamental operation of the element embodying the invention. The metal grid 8, however, can also be electrically connected with gas diffusion electrode 3 or, if only the gas diffusion electrode 3 functions as electrical take-off conductor, then it can be replaced by a coarse meshed grid of plastic. The grid thus remains the collection chamber for the by-products (metal hydroxides and water) which are formed during the current producing reaction.

In any case, it is important that the polyurethane gel be adjacent the entire boundary surface of the electrical take-off conductor facing the cathode space (in the FIGURE, the cover layer 6 of the gas diffusion electrode) so that a uniform supply of the reaction liquid takes place over the entire electrode surface area.

If the light metal electrode is of lithium, then the water which escapes from the cover layer 7 is capable of dissolving the primarily-produced lithium hydroxide, which is easily soluble, and removing it to the outside through the channels 10. However, the reactant solution should be diluted only to the extent to which the available quantity of water is just sufficient for dissolving the lithium hydroxide.

In accordance with the invention, the hydrogen peroxide in the polyurethane gel is present as an aqueous solution of about 3 to 15 percent and preferably 5 to 10 percent.

By increasing the density and virtually solidifying the cathode depolarizer $H_2O_2$ in the form of the polyurethane gel according to the invention, there is provided a galvanic primary element having very high energy content and high load capacity.

What is claimed is:

1. A galvanic primary element having a negative light metal electrode and hydrogen peroxide as the cathode depolarizer, wherein
    the hydrogen peroxide is fixated in a gel formed with polyurethane or with branched polyacrylic acid,
    the hydrogen peroxide-containing gel is positioned adjacent an electrical conductor which covers the surface of the light metal electrode and
    means are provided within the cell for pressing the gel against the conductor.

2. The element of claim 1 wherein the gel is formed with polyurethane.

3. The element of claim 1 wherein
    the electrical conductor is a coarse meshed metal grid and/or a gas diffusion electrode.

4. The element of claim 1 wherein
    the light metal electrode is a lithium electrode.

5. The element of claim 1 wherein
    the polyurethane gel is fixated in hydrogen peroxide as a 3–15% aqueous solution, and preferably 5–10%.

* * * * *